United States Patent
Yajima (10) Patent No.: US 6,597,640 B1
(45) Date of Patent: Jul. 22, 2003

(54) DISC DEVICE

(75) Inventor: Hirofumi Yajima, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 0 days.

(21) Appl. No.: 09/583,004

(22) Filed: May 26, 2000

(30) Foreign Application Priority Data

May 28, 1999 (JP) .......................................... 11-149605

(51) Int. Cl.$^7$ ................................................ G11B 7/00
(52) U.S. Cl. .................................................. 369/30.36
(58) Field of Search .......................... 369/53.28, 44.32, 369/30.36, 53.29, 219, 244, 270, 271, 114

(56) References Cited

U.S. PATENT DOCUMENTS

| | | | | |
|---|---|---|---|---|
| 4,956,833 A | * | 9/1990 | Kokado et al. | 369/44.41 |
| 5,119,357 A | * | 6/1992 | Tsuruta et al. | 369/75.2 |
| 5,761,182 A | * | 6/1998 | Jeon | 369/219 |
| 6,320,824 B1 | * | 11/2001 | Hirata | 369/53.29 |

* cited by examiner

Primary Examiner—William Korzuch
Assistant Examiner—Kimlien Le (57) ABSTRACT

A disk device has an optical pickup feed mechanism for reciprocating an optical pickup between the inner peripheral side and the outer peripheral side of a disc in the radial direction thereof. The optical pickup feed mechanism includes a threaded shaft threaded with a thread portion formed on an optical pickup main body for reciprocating the optical pickup main body in the radial direction of the disc while supporting it, a rotating drive source for reciprocating the optical pickup main body, and a rotation transmission gear fixed to an end of the threaded shaft for transmitting the rotation of the rotating drive source to the threaded shaft. The disc device further has a biting determination device for determining the biting of the optical pickup main body at an end of the threaded shaft, and a biting removal device for rotating the rotating drive source in such a direction as to remove the biting of the optical pickup main body when the biting determination device determines that the optical pickup main body is bitten. With this arrangement, the biting of the optical pickup main body, which is threaded with the threaded shaft and reciprocated in the radial direction of the disc, at an end of the threaded shaft can be removed by software, and the biting of the optical pickup main body at the end of the threaded shaft can be reliably removed without increasing a cost and without increasing the size of the device as a whole.

9 Claims, 7 Drawing Sheets

DISC DEVICE

BACKGROUND OF THE INVENTION

1. Field of the Invention

The present invention relates to improvement of a disc device including an optical pickup feed mechanism for reciprocating an optical pickup in the radial direction of a disc by a threaded shaft (screw shaft).

2. Description of the Related Art

Conventionally, there are known disc devices which include an optical pickup feed mechanism for reciprocating an optical pickup between the inner peripheral side and the outer peripheral side of a disc in the radial direction thereof.

The optical pickup feed mechanism includes, for example, a threaded shaft, which is threaded with a screw portion formed on an optical pickup main body and reciprocates the optical pickup main body in the radial direction of a disc while supporting it, a guide shaft, which is disposed in parallel with the threaded shaft and guides the optical pickup main body in the radial direction while supporting it, a rotating drive source, that is, a motor for reciprocating the optical pickup main body, and a rotation transmission gear, which is fixed to an end of the threaded shaft and transmits the rotation of the motor to the threaded shaft.

In this type of disc device, when the discs are DVD discs and the like, address read error may occur, and a CLV error which results from a spindle being out of synchrony for at least a predetermined period of time, while information recorded on the recording surfaces of the discs is read. These errors are generally called "servo errors".

When this type of the servo error occurs, there is a high probability that the objective lens of an optical pickup will be away from the recording surfaces of the discs and will be located on a mirror surface. To cope with this problem, conventionally, the threaded shaft is rotated so as to move the optical pickup by carrying out servo error processing as shown in the flowchart in FIG. 7 so that the objective lens will be located on the recording surface.

Figure 7:
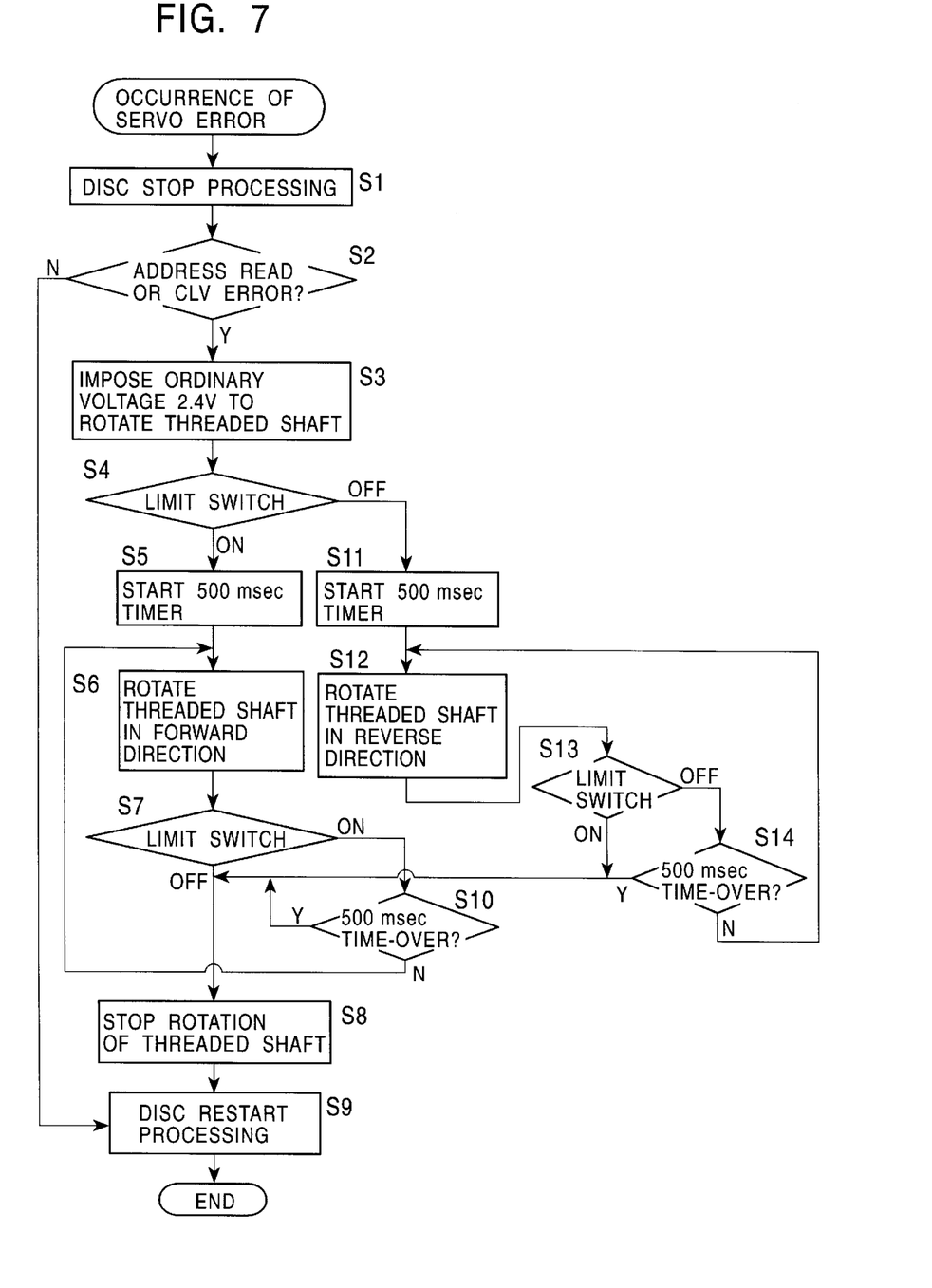
FIG. 7 is a view showing a flowchart of servo error processing of a conventional disc device.

For example, when the servo error occurs in the DVD disc, disc stop processing is carried out to stop the rotation of the disc (S.1), it is determined whether the servo error is the address read error or the CLV error (S. 2), when the servo error is the address read error or the CLV error, an ordinary voltage (for example, 2.4 V) is imposed on the motor as the rotating drive source to rotate the threaded shaft (S. 3), and it is determined whether a limit switch, which determines whether the optical pickup main body is located on the mirror surface on the inner peripheral side of the disc or on the mirror surface on the outer peripheral side thereof, is turned on or off (S. 4).

The limit switch is arranged such that it is turned on, for example, only when the optical pickup main body is located on the mirror surface on the inner peripheral side of the disc and is turned off when the optical pickup main body is located at a position nearer to the outer peripheral side than the mirror surface.

A microcomputer for controlling the operation of the disc device starts a 500 ms timer when the limit switch is turned on (S. 5), rotates the threaded shaft in a forward direction (S. 6), moves the optical pickup main body to the outer peripheral side of the disc and determines whether or not the limit switch is turned off (S. 7), stops the rotation of the threaded shaft when the limit switch is turned off (S. 8), and restarts the disc (S. 9). When the limit switch remains turned off at step S. 7, the process goes to step S. 10 where it is determined whether or not 500 milliseconds have passed (S. 10). When 500 milliseconds have not passed, the process returns to step S. 6 and performs the same processing, whereas when the 500 milliseconds have passed, the process goes to step S. 8, stops the rotation of the threaded shaft and restarts the disc (S. 9)

When it is determined at step S. 4 that the limit switch is turned off, it is determined that the optical pickup main body is not on the mirror surface on the inner peripheral side of the disc and the 500 ms timer is started (S. 11). Then, the threaded shaft is rotated in a reverse direction (S. 12), the optical pickup main body is moved to the inner peripheral side of the disc and it is determined whether or not the limit switch is turned on (S. 13). When the limit switch is turned on, the process goes to step S. 8, and after the rotation of the threaded shaft is stopped, the disc is restarted (S. 9), it is determined whether or not the 500 ms have passed when the limit switch remains turned off (S. 14). When 500 ms have passed, the process returns to step S. 12 and performs the same processing. Note that when an error other than the address read error and the CLV error is caused at step S. 2, the process goes to step S. 9 and restarts the disc.

In the conventional optical pickup mechanism, however, when the disc device is used in the environment of the compartment of a passenger car and the like, biting may be caused between the optical pickup main body and a rotation transmission gear fixed to an end of the threaded shaft or between the optical pickup main body and the other end of the threaded shaft by the servo error such as by the overrun of the threaded shaft due to being out of track while the information of a disc is read which is due to the influences of vibration and the like, the excessive approach to a mirror surface caused by a count error in the number of tracks during access, and the like. When the biting arises, a disadvantage results in that the biting cannot be removed even if an ordinary voltage is imposed, the optical pickup is continuously out of the recording surface of the disc and servo cannot be easily applied.

To avoid the biting, it is contemplated to arrange an optical pickup mechanism as a structure which does not cause the biting. When such a structure is employed, however, there is problems in that the structure becomes complex and cost is increased or a disc device is increased in size.

An object of the present invention, which was made in view of the above circumstances, is to provide a disc device which can remove the biting of an optical pickup main body, which is threaded with a threaded shaft and reciprocated in the radial direction of a disc, at an end of the threaded shaft by software and can reliably remove the biting of the optical pickup main body at the end of the threaded shaft without increasing cost and the size of the device as a whole.

SUMMARY OF THE INVENTION

In accordance with the present invention, there is provided a disc device comprising: an optical pickup feed mechanism for effecting reciprocal movement of an optical pickup between the inner peripheral side and the outer peripheral side of a disc in the radial direction thereof, the optical pickup feed mechanism including a threaded shaft for screwing engagement with a thread portion formed on an optical pickup main body for effecting the reciprocal movement of the optical pickup main body in the radial direction of the disc while supporting the optical pickup main body, a rotating drive source for causing the reciprocal movement of the optical pickup main body, and a rotation transmission gear fixed to an end of the threaded shaft for transmitting the rotation of the rotating drive source to the threaded shaft; a biting determination means for determining the biting of the optical pickup main body at an end of the threaded shaft; and a biting removal means for rotating the rotating drive source in such a direction as to remove the biting 6f the optical pickup main body when the biting determination means determines that the optical pickup main body is bitten.

According to the present invention arranged as described above, it is preferable that the biting of the optical pickup main body be determined by software.

It is preferable that the rotating drive source be a motor and that the biting removal means include a high voltage imposing means for imposing, when the biting of the optical pickup main body is not removed, a high voltage which is higher than an ordinary voltage which is imposed on the motor to reciprocate the optical pickup main body by the threaded shaft.

According to the above arrangement, since the biting is removed by imposing a voltage higher than the ordinary voltage, the biting can be reliably removed.

It is preferable that the high voltage imposing means increase the high voltage stepwise.

According to the above arrangement, the circumstances in which the biting is caused again by the execution of the biting removing processing can be avoided.

It is preferable that the high voltage imposing means vary a period of time, during which the high voltage is imposed, stepwise.

According to the above arrangement, the biting can be easily removed because an impact is applied in rotation by imparting variation to the period of time during which the high voltage is imposed.

It is preferable that the biting removal means include a biting removal determination means for determining whether or not the biting of the optical pickup main body is removed.

According to the above arrangement, whether or not the biting is removed can be reliably determined.

It is preferable that the biting removal determination means include one set of a limit switch for determining whether the optical pickup main body is located on the inner peripheral side or on the outer peripheral side of the disc in the radial direction thereof.

It is preferable that the biting removal determination means determine whether or not the biting is removed in a different period of time depending upon whether the biting occurs on the inner peripheral side of the disc or on the outer peripheral side thereof.

According to the above arrangements, the removal of the biting can be determined using an existing limit switch.

It is preferable that the biting removal determination means have a waiting time until the ordinary voltage is imposed after the high voltage is imposed.

According to the above arrangement, an unintended movement of the optical pickup main body, which is caused by instantly imposing the ordinary voltage on the rotating drive source after the removal of the biting, can be prevented.

DESCRIPTION OF THE PREFERRED EMBODIMENT

Figure 1:
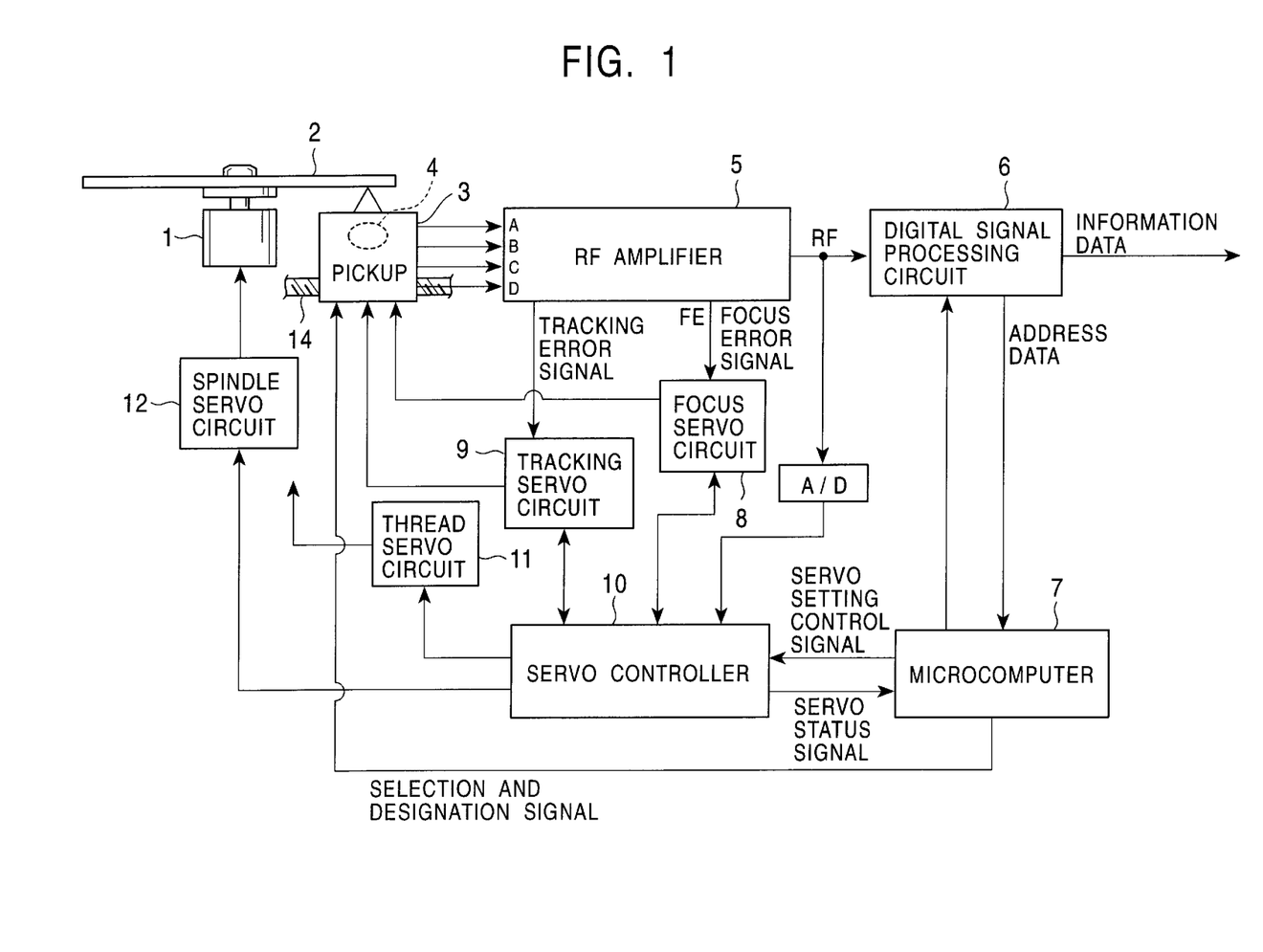
FIG. 1 is a block diagram of the reading circuit of a disc device according to the present invention.

FIG. 1 shows a block circuit diagram of the reading circuit of a disc device according to the present invention, wherein reference numeral 1 denotes a spindle motor, reference numeral 2 denotes a DVD disc, reference numeral 3 denotes an optical pickup, and reference numeral 4 denotes the objective lens of the optical pickup.

The optical pickup 3 is reciprocated by an optical pickup feed mechanism in the radial direction of the DVD disc 2 between the inner peripheral side and the outer peripheral side thereof. First, the reading circuit of the disc device will be described, while the optical pickup feed mechanism will be described later.

The laser beam emitted from the optical pickup 3 is focused on and irradiated on the DVD disc 2 through the objective lens 4, and the laser beam reflected from the DVD disc 2 is focused by the objective lens 4 and is received by a known four-divisional light receiving element (whose illustration is omitted). The respective output from the four-divisional light receiving element is output to an RF amplifier 5.

The RF amplifier 5 amplifies the respective signals from the optical pickup 3 as well as plays a role in creating an RF signal, a tracking error signal, and a focus error signal by a known appropriate method based on the respective signals. The RF signal is input to a digital signal processing circuit 6 which plays a role in converting the RF signal into a digital signal and demodulating address data and information data such as image data and the like. The information data and the like are sent to, for example, an image processing circuit on a rear stage, and the address data is sent to a microcomputer 7. The focus error signal is sent to a focus servo circuit 8, and the tracking error is sent to a tracking servo circuit 9.

The microcomputer 7 is used to control the operation of the disc device and sends and receives information to and from an operation unit (whose illustration is omitted), that is, to and from a ROM and a RAM, when necessary.

A servo controller 10 controls the focus servo circuit 8, the tracking servo circuit 9, a thread servo circuit 11 and a spindle servo circuit 12 as well as outputs servo status signals such as a focus servo OK signal, a spindle servo OK signal, and the like to the microcomputer 7. The microcomputer 7 outputs a servo setting control signal to the servo controller 10 as well as outputs a selection and designation signal for selecting and designating a disc to be read to the optical pickup 3. Note that the RF signal is subjected to A/D conversion and input to the servo controller 10. When the disc 2 is a CD, an E signal and an F signal also are sent from the optical pickup 3 to the RF amplifier 5 to create the tracking error signal.

Figure 2:
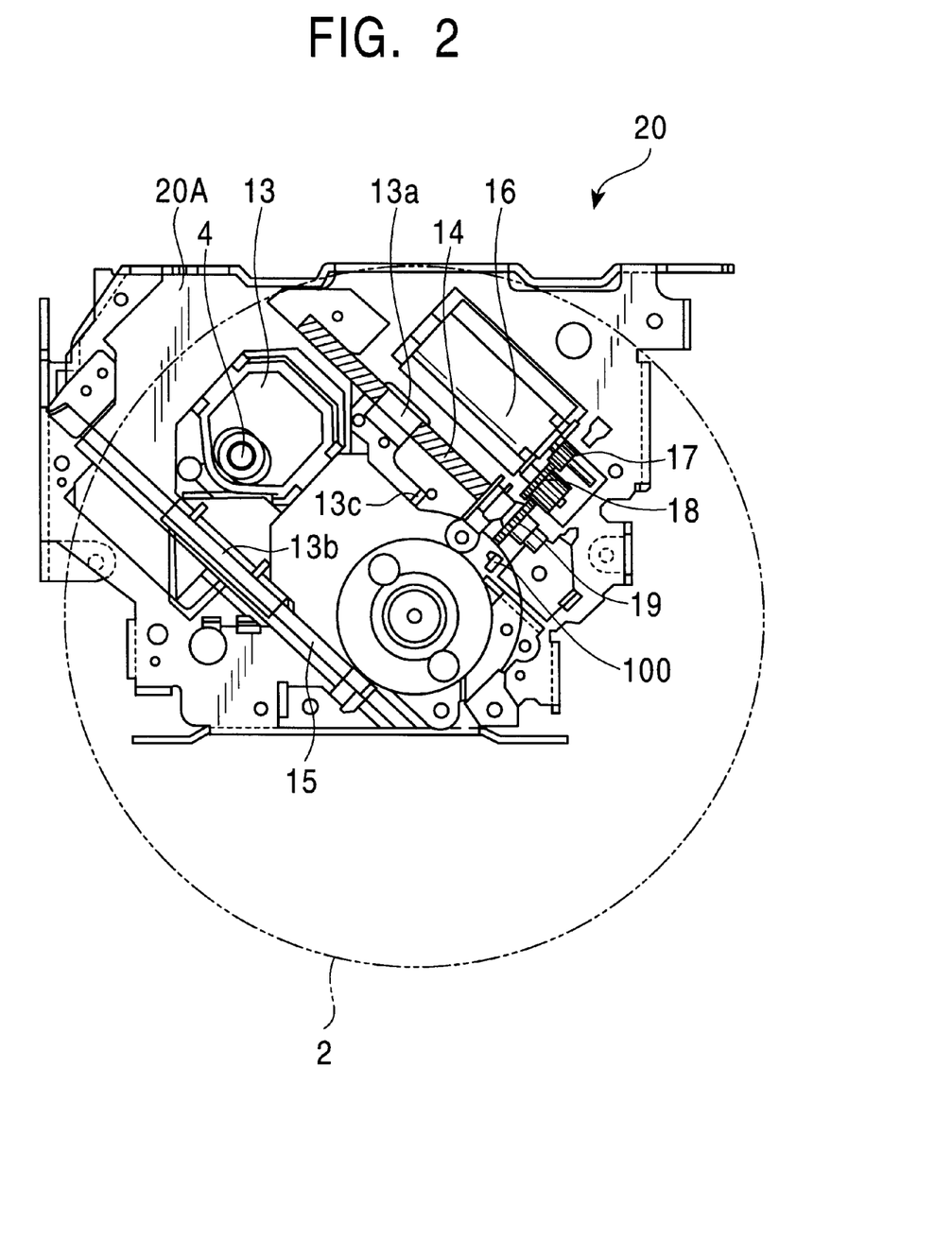
FIG. 2 is a plan view showing the feed mechanism of an optical pickup shown in FIG. 1.

As shown in FIG. 2, the optical pickup feed mechanism is disposed on the substrate 20A of a drive unit 20. The substrate 20A includes a threaded shaft 14, a guide shaft 15, and a motor 16 each disposed thereon. The threaded shaft 14 is threaded with a thread portion formed on the first arm section 13a of an optical pickup main body 13 and reciprocates the optical pickup main body 13 in the radial direction of the DVD disc 2 while supporting it. The guide shaft 15 is disposed in parallel with the threaded shaft 14 and is engaged with the second arm section 13b of the optical pickup main body 13 and guides the optical pickup main body 13 in the radial direction while supporting it. The motor 16 serves as a rotational drive source for reciprocating the optical pickup main body 13.

An output gear 17 is mounted on the output shaft of the motor 16, an intermediate gear 18 is meshed with the output gear 17, and a rotation transmission gear 19 is meshed with the intermediate gear 18. The rotation transmission gear 19 is fixed to an end of the threaded shaft 14 on the inner peripheral side of the disc 2 in the radial direction thereof, and a limit switch 100 is disposed on the inner peripheral side of the disc 2 in the radial direction thereof so as to face the reciprocating region of the optical pickup main body 13.

The limit switch 100 is disposed such that when the optical pickup main body 13 reaches the innermost peripheral position of the disc, it is pressed by an arm 13c provided with the optical pickup main body 13 and is turned on. When the limit switch 100 is turned on, the optical pickup 3 may face the mirror surface of the innermost periphery of the disc 2.

Figure 3:
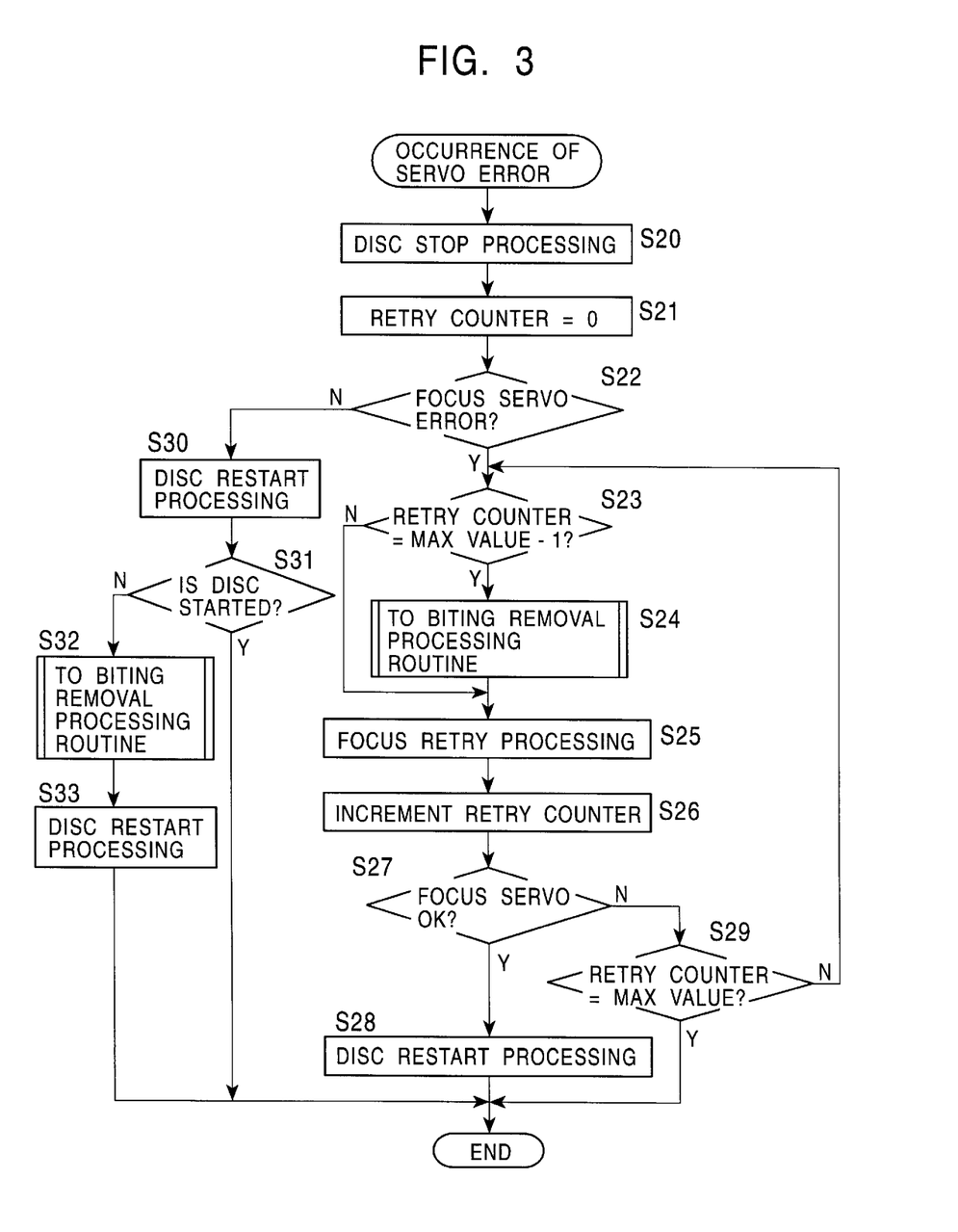
FIG. 3 is a view showing a flowchart of servo error processing according to the present invention.

As shown in FIG. 3, when the servo error arises in the disc device while the disc is read, the microcomputer 7 carries out disc stop processing to stop the rotation of the disc 2 (S. 20). Here, the servo error refers to a timeout error, in addition to the focus servo error, the CLV servo error and the address read error (or an SUBQ data error). The timeout error means an error caused by designated processing not being finished within a designated period of time and includes an access error (error caused when an access is not finished within 10 seconds), a read-in error (error caused when a read-in area is not read even if 20 seconds have passed after the disc is started), a thread return error (error caused when processing for returning the optical pickup to an initial position is not finished within 6 seconds), and the like.

Next, the content of a retry counter is reset to "0" (S. 21). The retry counter shows how many times the focus servo is retried when the focus servo error arises while the disc 2 is read.

Next, the microcomputer 7 determines whether or not the servo error is the focus servo error (S. 22), and when it is a focus servo error, the microcomputer 7 determines whether or not the value of the retry counter is "MAX-1" (step S. 23).

"MAX" means/the maximum number of retry of the focus servo error and is used to determine the biting of the optical pickup main body 13 at the end of the threaded shaft 14. When the determination at step S.23 is NO, biting removing is skipped and focus retry processing is carried out (S. 25), whereas when the determination is YES, after the biting removing processing is carried out, the focus retry processing is performed (S. 25). The biting removing processing will be described later.

After the microcomputer 7 carries out focus servo reapplying processing at step S. 25 and then increments the retry counter (S.26), it determines whether or not the focus servo is applied (S. 27). When the determination at step S.27 is YES, the disc is restarted (S. 28) and the servo error processing is finished. When the determination at step S.27 is NO, the process goes to step S. 29 where it is determined whether or not the content of the retry counter is set to "MAX". When the determination at step S. 29 is YES, the servo error processing is finished even if the focus servo is not applied.

When the determination at step S.29 is NO, the process goes to step S. 23 and the processing steps at S. 23, S.25–S.27, S29 are repeated until the content of the retry counter is set to "MAX-1". When the determination at step S. 29 is YES, an error display and the like are carried out when necessary and the processing is finished.

When the content of the retry counter is "MAX-1" at step S. 23, it is assumed that biting has occurred at the optical pickup main body 13 and the biting removing processing is carried out (S. 24).

When the servo error is an error other than the focus servo error, the determination of the microcomputer 7 at S. 22 is NO and the disc is restarted (S. 30). Then, the microcomputer 7 determines whether or not the disc is started (S. 31), and when the disc is started, the servo error processing is finished. Whereas, when the disc is not started, after the biting removing processing is carried out (S. 32), the disc is restarted (S. 33) and the servo error processing is finished.

When the servo error is an error other than the focus servo error, disc restart processing is tried only once and it is tried a plurality of times only when the focus servo error arises, and thereafter the biting removing processing is carried out. This is because of a reason described below.

That is, when the focus servo error arises, since the focus servo may not be applied at once by the retry carried out once due to the vibration of the disc device, damage to a disc surface, and the like, it is not proper to instantly determine that biting has occurred in such a case.

Figure 4:
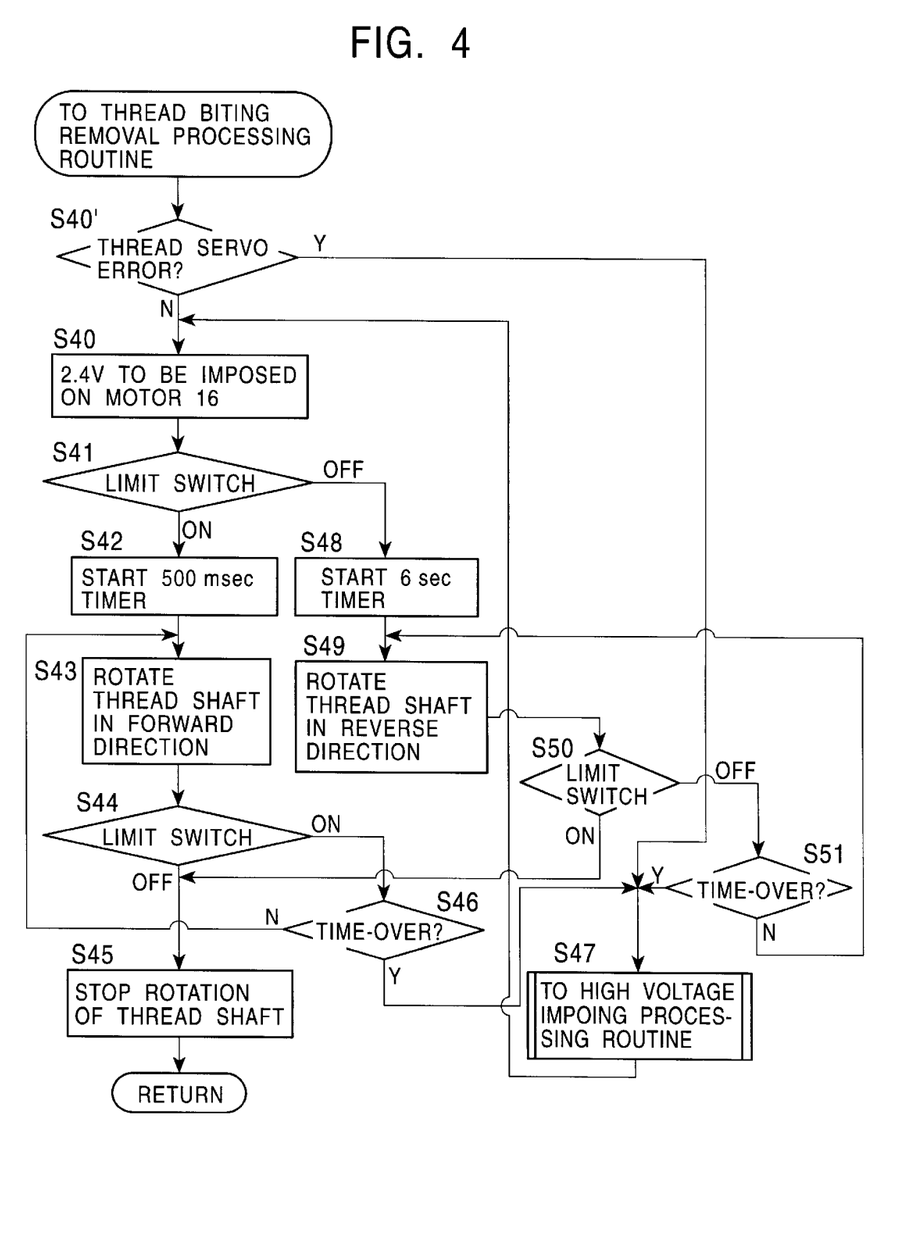
FIG. 4 is a flowchart of biting removing processing shown in FIG. 3.

Next, the biting removing processing will be described with reference to FIG. 4.

When the biting removing processing is started, the microcomputer 7 first determines whether or not the thread servo error arose (S. 40'). When the determination is YES, it is determined that biting has certainly occurred at the gear and the process goes to high voltage imposing processing, whereas when the determination is NO, the process goes to step S. 40. Note that the processing may be started from step S. 40 by omitting step S. 40'. A voltage to be imposed on the motor 16 is set to an ordinary voltage (for example, 2.4 V) (step S. 40) and then it is determined whether or not the limit switch 100 is turned on (S. 41). When the limit switch 100 is turned on, since there is a possibility that the biting of the optical pickup main body 13 itself occurred on the inner peripheral side of the disc, the 500 ms timer is started (S. 42) and the threaded shaft 14 is rotated in a forward direction (S. 43). Next, the microcomputer 7 determines whether the limit switch 100 is turned on or off (S. 44).

When the limit switch 100 is turned off, it is determined that the biting is removed. Thus, the forward rotation of the threaded shaft 14 is stopped (S. 45) and the process returns to the processing at step S. 24 or to the processing at step S. 32 and subsequent steps. When the limit switch 100 is turned on, it is determined whether or not 500 ms have passed (S. 46). When 500 ms have not passed, the process returns to step S. 43 and continues the rotation of the threaded shaft 14 again (S. 43). Whereas, when the limit switch 100 is turned off, it is determined that the biting is removed. Thus, the rotation of the threaded shaft 14 is stopped (S. 45), and the process returns to the processing at step S. 24 or to the processing at step 32 and subsequent steps. When the 500 ms have passed at step S. 46, the process goes to step S. 47 and high voltage imposing processing for imposing a high voltage which is higher than the ordinary voltage on the motor 16 is carried out. The high voltage imposing processing will be described later.

When the limit switch 100 is turned off at step S.41, it is determined that there is a possibility that biting is caused on the outer peripheral side of the disc 2, and a 6-second timer is started (S. 48). Then, after the threaded shaft 14 is rotated in reverse (S. 49), the microcomputer 7 determines whether or not the limit switch 100 is turned on (S. 50). When the limit switch 100 is turned on, it is determined that the biting is removed. Thus, the rotation of the threaded shaft 14 is stopped (S. 45), and when the limit switch 100 remains turned off, the process goes to step S. 51 and it is determined whether or not 6 seconds have passed. When 6 seconds have not passed at step S. 51, the process returns to step S. 49 and the threaded shaft 14 is continuously rotated in reverse, whereas when 6 seconds have passed, the process goes to step S. 47 and carries out the high voltage imposing processing. A reason for the threaded shaft 14 being continuously rotated for "6 seconds" when the biting is caused on the outer peripheral side of the disc 2 is that since the limit switch 100 is turned on only at an inner peripheral position of the disc 2 and is turned on except at the inner peripheral position, whether or not the biting is removed cannot be determined unless the optical pickup 3 is moved up to the inner peripheral side of the disc 2.

Figure 5:
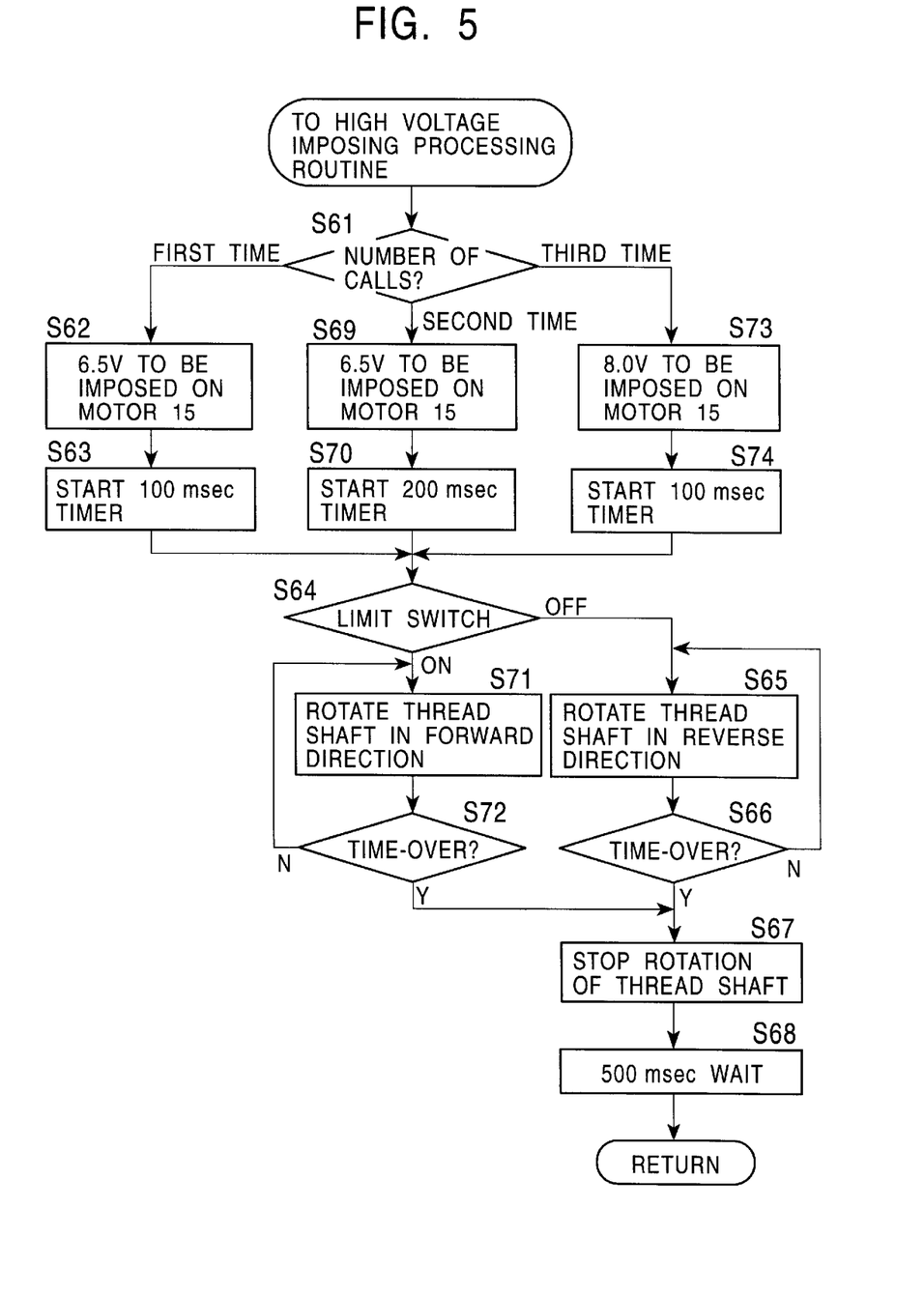
FIG. 5 is a flowchart of high voltage imposing processing shown in FIG. 4.

In the high voltage imposing processing, the microcomputer 7 first determines the number of calls (S. 61), and when the high voltage imposing processing is called for the first time, the voltage which is imposed on the motor 16 is set to, for example, 6.5 V (S. 62) as shown in FIG. 5. Next, the 100 ms timer is started (S. 63), and it is determined whether or not the present state limit switch 100 is turned on (S. 64). Here, description will be made assuming that biting is caused on the outer peripheral side of the disc 2 for the convenience of explanation. Note that the number of calls is reset when the restart of the disc is finished.

In this case, since the limit switch 100 is turned off, the process goes to step S. 65 and rotates the threaded shaft 14 in the reverse direction. Then, it is determined whether 100 ms have passed or not (S. 66). When the 10 ms have not passed, the process returns to step S. 65 and the rotation of the threaded shaft 14 is continued until the 100 ms have passes. Whereas, when it is determined at step S.66 that the 100 ms have passed, the reverse rotation of the threaded shaft 14 is stopped (S. 67), waiting is performed for 500 ms (S. 68), and the process returns to step S. 40 where the biting removing processing is carried out.

Therefore, when the biting is caused on the outer peripheral side of the disc 2 and the biting removing processing is started in first high voltage imposing processing, the ordinary voltage H1 (2.4 V) is imposed on the motor 16 for 6 seconds. Then, when the limit switch 100 is not turned on even if 6 seconds have passed, a high voltage H2 (6.5 V) is imposed on the motor 16 for 100 ms.

After the execution of the first high voltage imposing processing, the microcomputer 7 carries out the biting removing processing again and imposes the ordinary voltage of 2.4 V on the motor 16 for 6 seconds. When the limit switch 100 is not turned on even if 6 seconds have passed, it is determined that the biting state is still continued and the high voltage imposing processing is carried out again (S. 46).

In second high voltage imposing processing, after it is determined that a second call is issued at step S.61 and the high voltage of 6.5 V, which is higher than the ordinary voltage, is set so as to be imposed on the motor 16 (S. 69), a 200 ms timer is started (S. 70), the process goes to step S. 65 and the threaded shaft 14 is rotated in reverse because the present state limit switch 100 is turned off, it is determined whether 200 ms have passed (S. 66), and the processing at step S.65 is continued until the 200 ms have passed. Then, when the 200 ms have passed, the process goes to step S.67 and the reverse rotation of the threaded shaft 14 is stopped, waiting is performed for 500 ms (S. 68) and then the process returns again to step S. 40 where the biting removing processing is carried out.

Figure 6:
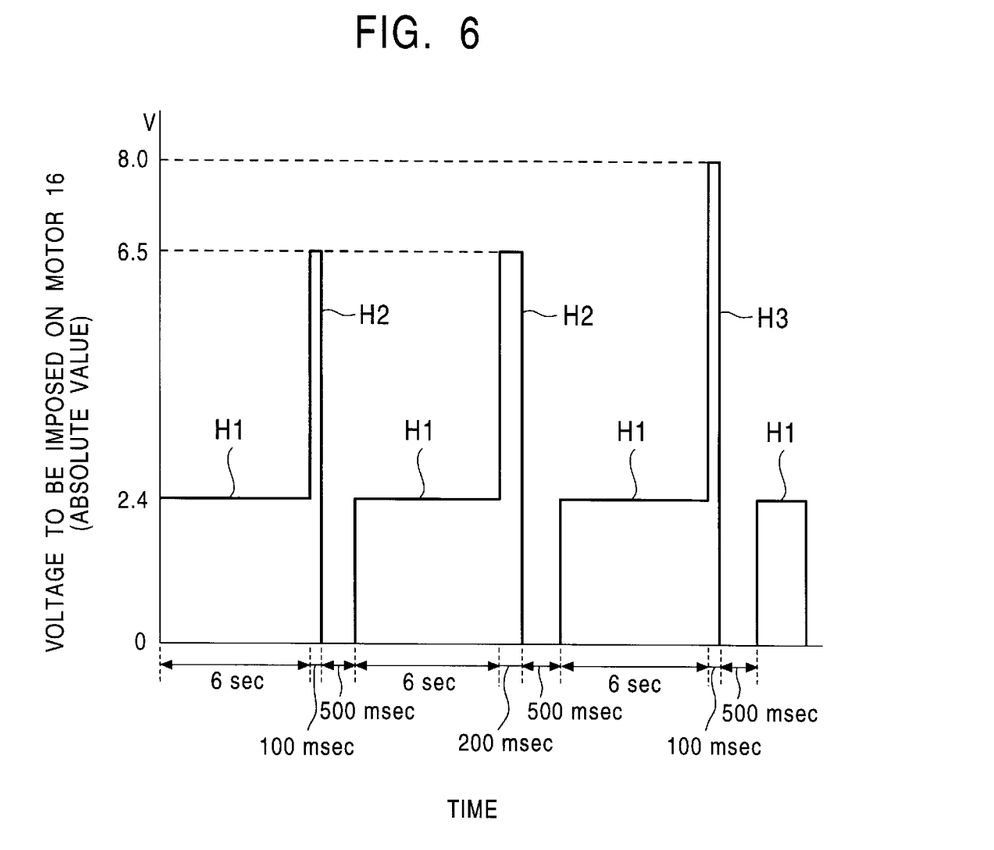
FIG. 6 is a view explaining voltages imposed on a motor when biting on the outer peripheral side of the optical pickup is removed.

Therefore, since the biting is still continued in the second call for carrying out the second high voltage imposing processing, after the ordinary voltage H1 of 2.4 V is imposed on the motor 16 for 6 seconds, the high voltage H2 of 6.5 V is imposed on the motor 16 for 200 ms as shown in FIG. 6.

When the biting is not removed even in the second high voltage imposing processing, that is, when the process returns to the biting removing processing and 6 seconds have passed at step S. 51 in the state in which the limit switch 100 remains turned off at step S. 50, the high voltage imposing processing is started again. At that time, it is determined that a third call is issued at step S.61, the process goes to step S. 73 and a maximum voltage H3 which is higher than the high voltage H2 is set so as to be imposed on the motor 16 (S. 73). Thereafter, the 100 ms timer is started (S. 74).

Then, since the present state limit switch 100 is turned off (S. 64), the same processing as that of the first call and the second call is carried out.

A reason the maximum voltage H3 is imposed in the third call in the high voltage imposing processing is as described below.

For example, when the biting is not severe at the inner peripheral side of the disc 2, if the maximum voltage H3 is imposed on the motor 16 from the beginning, the optical pickup 3 is moved with great force to the outer peripheral side of the disc 2, thus there is a possibility that the biting will occur again on the outer peripheral side thereof. Furthermore, when the biting is not severe at the outer peripheral side of the disc 2, if the maximum voltage H3 is imposed on the motor 16 from the beginning, the optical pickup 3 is moved with great force to the inner peripheral side of the disc 2; thus, there is a possibility that the biting will occur again on the inner peripheral side thereof. To remove the biting, a voltage higher than the voltage imposed in the occurrence of the biting must be imposed. Accordingly, when the high voltage H2 or H3 is imposed from the beginning, if biting is caused again in the disc region on an opposite side regardless of whether the previous biting has been removed once by the execution of the biting removing processing, the biting removing processing cannot be carried out.

In addition, a reason the threaded shaft 14 is rotated by imposing the ordinary voltage Hi again after the high voltage is imposed and the rotation of the threaded shaft 14 is stopped for 500 ms is as described below. If the ordinary voltage H1 is imposed instantly after the threaded shaft 14 is rotated by imposing the high voltage H2 or H3, since the rotation of the threaded shaft 14 is encouraged by the high voltage H2 or H3 imposed thereof, the threaded shaft 14 is rotated at a number of revolutions which is larger than that of the threaded shaft 14 at which it is to be rotated by the ordinary voltage H1 and the optical pickup 3 is moved to an unintended position. To avoid the occurrence of the above circumstances, the ordinary voltage H1 is imposed again after the threaded shaft 14 is stopped once.

FIG. 6 shows a time chart of the waveforms of the voltages imposed on the motor 16 until the biting is removed at the time a fourth ordinary voltage H1 is imposed after the third biting removing processing is carried out.

While the above description has been made assuming that the biting occurred at to the optical pickup main body 13 on the outer peripheral side of the disc 2, since a case in which the biting occurs in the inner peripheral side thereof is apparent from the description of the above flowcharts, detailed description of this case is omitted.

When the biting is removed in the high voltage imposing processing routine, the process goes to step S.45 from step S.44 or S.50 and the rotation of the tread motor 16 is stopped. Then, the disc 2 is restarted.

The case of the DVD disc 2 has been described in the embodiment of the present invention, the present invention is not limited thereto and also can be applied to a CD disc.

Since the present invention is arranged as described above, the biting of the optical pickup main body, which is threaded with the screw shaft and reciprocated in the radial direction of the disc, can be removed by software and the biting of the optical pickup main body at the end of the threaded shaft can be reliably removed without increasing cost and without increasing the size of the device as a whole.

What is claimed is:

1. A disc device comprising:

an optical pickup feed mechanism for effecting reciprocal movement of an optical pickup between the inner peripheral side and the outer peripheral side of a disc in the radial direction thereof, said optical pickup feed mechanism including a threaded shaft for screwing engagement with a thread portion formed on an optical pickup main body for effecting the reciprocal movement of the optical pickup main body in the radial direction of the disc while supporting the optical pickup main body, a rotating drive source for causing the reciprocal movement of the optical pickup main body, and a rotation transmission gear fixed to an end of the threaded shaft for transmitting the rotation of the rotating drive source to the threaded shaft;

a biting determination means for determining the biting of the optical pickup main body at an end of the threaded shaft; and a biting removal means for rotating the rotating drive source in such a direction as to remove the biting of the optical pickup main body when said biting determination means determines that the optical pickup main body is bitten.

2. A disc device according to claim 1, the rotating drive source is a motor and said biting removal means comprises a high voltage imposing means for imposing, when the biting of the optical pickup main body is not removed, a high voltage which is higher than an ordinary voltage which is imposed on the motor to reciprocate the optical pickup main body by the threaded shaft.

3. A disc device according to claim 2, wherein said high voltage imposing means increases the high voltage stepwise.

4. A disc device according to claim 2, wherein said high voltage imposing means (7) varies a period of time, during which the high voltage is imposed, stepwise.

5. A disc device according to claim 1, wherein said biting removal means comprises a biting removal determination means for determining whether the biting of the optical pickup main body is removed.

6. A disc device according to claim 5, wherein said biting removal determination means includes one set of a limit switch for determining whether the optical pickup main body is located on the inner peripheral side or on the outer peripheral side of the disc in the radial direction thereof.

7. A disc device according to claim 6, wherein said biting removal determination means determines whether the biting is removed in a different period of time depending upon whether the biting is caused on the inner peripheral side of the disc or on the outer peripheral side thereof.

8. A disc device according to claim 7, wherein said biting removal determination means has a pausing time until the ordinary voltage is imposed after the high voltage is imposed.

9. A disc device according to claim 3, wherein said high voltage imposing means (7) varies a period of time, during which the high voltage is imposed, stepwise.

* * * * *